United States Patent [19]

Grossman

[11] Patent Number: 5,571,758

[45] Date of Patent: Nov. 5, 1996

[54] NITROGEN-REACTED SILICON CARBIDE MATERIAL

[75] Inventor: Theodore R. Grossman, Hamilton, Ohio

[73] Assignee: General Electric Company, Cincinnati, Ohio

[21] Appl. No.: 359,357

[22] Filed: Dec. 19, 1994

Related U.S. Application Data

[63] Continuation of Ser. No. 108,417, Aug. 19, 1993, abandoned.

[51] Int. Cl.$^6$ .................................................. C04B 35/58
[52] U.S. Cl. .............................................. 501/92; 423/345
[58] Field of Search ...................... 423/345; 264/56, 264/65, 60, 101; 501/88, 92

[56] References Cited

U.S. PATENT DOCUMENTS

| | | | |
|---|---|---|---|
| 2,750,268 | 6/1956 | Erasmus et al. | 423/344 |
| 3,459,842 | 8/1969 | Wakefield | 264/56 |
| 3,495,939 | 2/1970 | Forrest | 264/65 |
| 4,294,788 | 10/1981 | Laskow et al. | 264/101 |
| 4,572,848 | 2/1986 | Pollak et al. | 427/294 |
| 5,011,639 | 4/1991 | Urasato et al. | 264/65 |
| 5,205,970 | 4/1993 | Brun et al. | 264/60 |
| 5,246,894 | 9/1993 | Okuda et al. | 501/88 |

*Primary Examiner*—Michael Lewis
*Assistant Examiner*—Amy M. Harding
*Attorney, Agent, or Firm*—Andrew C. Hess; David L. Narcisco

[57] ABSTRACT

A process for preparing a material includes preparing a preform having carbon particles and a carrier material. A first end of a wick, made of a material that is wetted by liquid silicon, is contacted to the preform. The wick and the preform are heated to a temperature greater than the melting point of silicon, so that silicon flows along the wick to the preform. The silicon reacts with the carbon particles to form silicon carbide. At least a portion of the reaction of carbon and silicon is performed in an atmosphere containing a source of nitrogen and substantially free of oxygen, so that free silicon reacts to form silicon nitride.

20 Claims, 4 Drawing Sheets

NITROGEN-REACTED SILICON CARBIDE MATERIAL

This application is a continuation of application Ser. No. 08/108,417 filed Aug. 19, 1993 abandoned.

BACKGROUND OF THE INVENTION

This application relates to infiltrated silicon carbide-based materials, and, more particularly, to such materials wherein the processing is controlled to avoid residual silicon in the final product.

Ceramic materials are inherently brittle and hard. Post-fabrication machining operations are difficult and costly because they usually involve extensive diamond grinding and polishing. It is therefore beneficial to form and process a ceramic article to its final shape to avoid or minimize secondary machining operations. Near net shape forming techniques exist and are put into practice for ceramic articles.

Silicon carbide is one such ceramic material, which may be prepared to its final form. In one fabrication technology designed to yield a stoichiometric silicon carbide material, a preform containing particulate carbon is first prepared. One end of a wick, made of a material that is wetted by molten silicon, is attached to the preform, and the other end left free on a support surface. The required stoichiometric equivalent of solid silicon is placed onto the free end of the wick, and the entire assembly is placed into a vacuum furnace and the furnace is evacuated to an appropriate pressure. The vacuum furnace is heated to a temperature above the melting point of the silicon, so that the silicon melts. The molten silicon is drawn along the wick by capillary forces to infiltrate and wet the carbon particulate preform, where it reacts in situ with the carbon present in the preform to form silicon carbide. Upon cooling, the silicon carbide is present in its as-fabricated, final form.

In a preferred form of this process, the preform also contains fibers such as silicon carbide fibers. The carbon is present as particles interspersed between the fibers of the preform. The infiltrated silicon reacts with the carbon located between the fibers to produce silicon carbide. Upon cooling, the result is a near-net-shape composite material of fibers such as silicon carbide fibers in a silicon carbide matrix.

While this process is operable and has been used successfully in a wide variety of applications, there is room for improvement. In some instances incomplete reaction of silicon has been observed, so that some free silicon remains in the material after cooling to room temperature. Upon reheating to a sufficiently high service temperature, the silicon may remelt and remain in contact with the silicon carbide fibers for a prolonged period of time. The silicon can attack the silicon carbide fibers, resulting in diminished properties of the composite material. Even where no silicon carbide fibers are present in the material, the presence during service of a molten phase within an otherwise solid material is undesirable.

Thus, there is a need for an improved silicon carbide material produced by the silicon infiltration approach. The present invention fulfills this need.

SUMMARY OF THE INVENTION

The present invention provides an improved silicon carbide material and an infiltration process for its preparation. The material has a diminished likelihood of residual silicon present in the structure after fabrication is complete. It also may have a protective layer on its exterior surface, if processed to have such a layer. The approach of the invention can be used either with or without the presence of silicon carbide or other fibers.

In accordance with one embodiment of the invention, a process for preparing a material includes the step of preparing a preform comprising carbon particles, and a carrier material. A first end of a wick, made of a material that is wetted by molten silicon, is contacted to the preform. The stoichiometric equivalent of solid silicon is placed onto the free end of the wick. The wick and the preform are heated to a temperature greater than the melting point of silicon, and silicon is flowed along the wick to the preform, so that the silicon reacts with the carbon particles to form silicon carbide. At least a portion of the step of heating is performed in an atmosphere containing a source of nitrogen and substantially free of oxygen, to cause any free, unreacted silicon to react to form silicon nitride. The source of nitrogen is preferably ammonia gas or nitrogen gas.

During the initial stages of the reaction of infiltrated silicon and carbon, the atmosphere is preferably a vacuum or an inert gas. The silicon and carbon react to form silicon carbide in such an atmosphere. However, at later stages, an atmosphere having the source of nitrogen, preferably ammonia gas or nitrogen gas, is introduced. Any free silicon present at this point is reacted with the nitrogen to produce silicon nitride. The silicon nitride may be formed as an in-situ solid solution throughout the interior of the reacting preform, as an intermittent or layered structure or only at the exterior surface to form a shell or crust around the preform. Because silicon nitride is more thermodynamically stable in air than silicon carbide and because silicon nitride has different strength and fracture toughness characteristics than silicon carbide, increased oxidation resistance and more desirable mechanical properties can be achieved by incorporating silicon nitride into the reacting preform. The arrangement of the silicon nitride depends upon the time and extent of silicon-carbon reaction when the nitrogen-containing atmosphere is introduced.

The reduction or elimination of free silicon in the final material has the important result that no free silicon is present to be remelted in the material when it is reheated during service. There is therefore no significant amount of liquid silicon present within the material during service, to weaken the material directly or indirectly through reaction with the silicon carbide fibers, if present. Other features and advantages of the invention will be apparent from the following more detailed description of the invention, taken in conjunction with the accompanying drawings, which illustrate, by way of example, the principles of the invention.

DETAILED DESCRIPTION OF THE INVENTION

Figure 1:
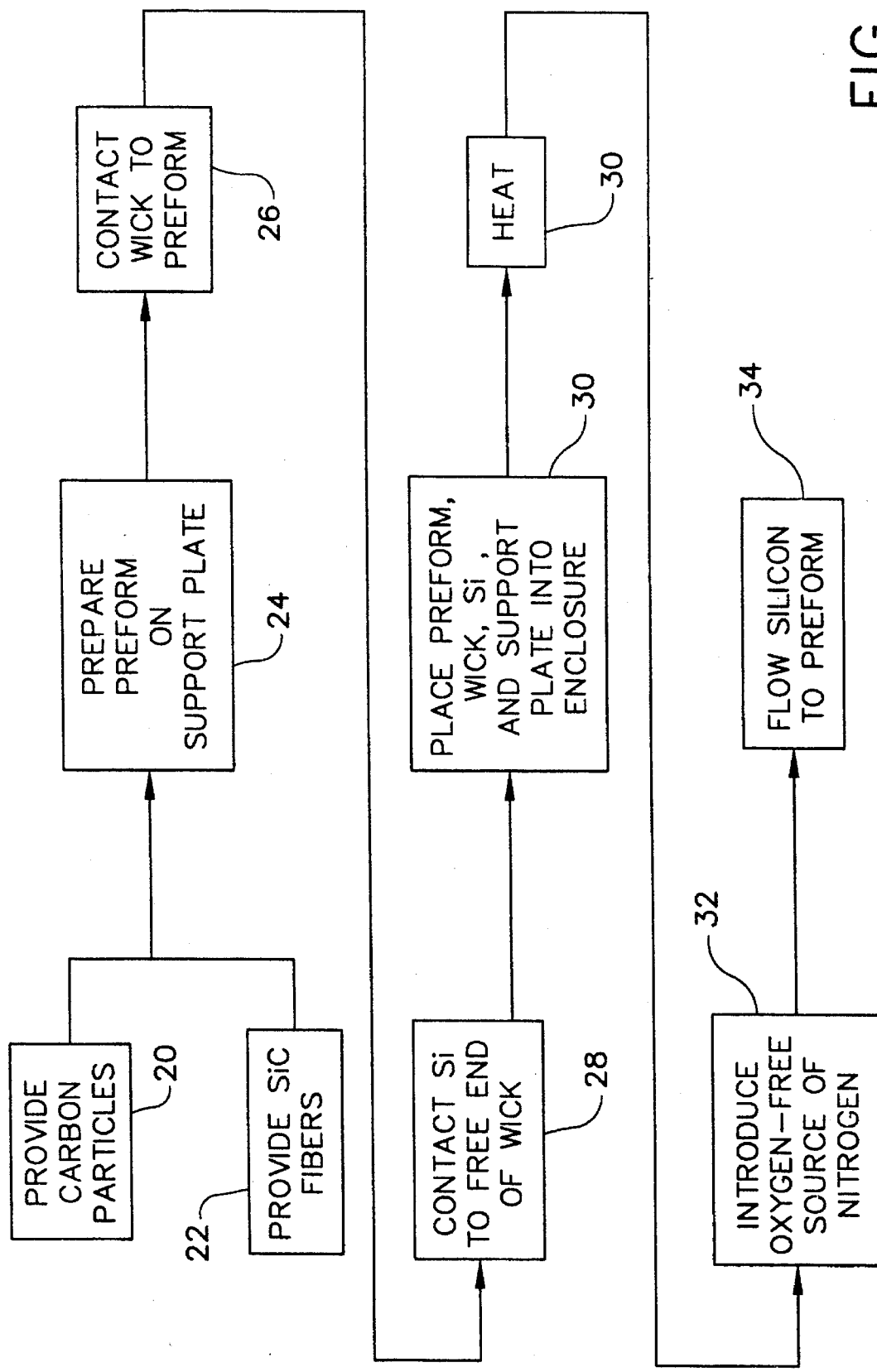
FIG. 1 is a process flow diagram for the approach of the invention.

As depicted in the process flow diagram of FIG. 1, in a preferred embodiment the present invention provides carbon particles, numeral 20, and silicon carbide fibers, numeral 22. The silicon carbide fibers are preferably elongated with an aspect ratio of at least 10–100 or more. Silicon carbide fibers such as Textron SCS-6 fibers, coated or uncoated, are an example of an operable fiber type. The fibers may be in the form of monofilaments, multifilaments, woven fabric, or any other operable form. The fibers may, but need not be, aligned parallel to a common direction. The carbon particles must be of a sufficiently small size to fit interstitially between a mat of the silicon carbide fibers.

A preform is prepared from the silicon carbide fibers and the carbon particles, numeral 24. Preforms may be prepared in any operable manner that is suitable for the article to be made. Two methods are currently preferred, slurry casting and tape casting. These methods will be described briefly, but the invention is not limited to these methods for preparing the preform.

In slurry casting, carbon particles are provided, by crushing of carbon felt or otherwise. Typical carbon particles are about 6 micrometers in diameter with an aspect ratio of 10–20. A slurry is prepared by mixing liquid epoxy into xylene in a 50:50 weight ratio, and then adding the carbon particles. The carbon particles are typically provided in an amount that is about half the weight of the epoxy solution, but this may be varied as desired. A catalyst for the epoxy, such as diethylenetriamine is added in the amount appropriate for the epoxy, typically about 10 percent by weight of the epoxy in the slurry. The slurry is de-aired by allowing it to stand or by outgassing in vacuum. Casting is accomplished into a mold having silicon carbide fibers arranged as desired for the article to be made. For example, layers of silicon carbide fibers (or woven mats, or other form) may be placed into the mold and the slurry added between the fiber layers. When the uncured structure is built up to the desired shape and size, a vacuum is applied to remove gas and excess solvent, and to consolidate the slurry and the fiber array. The resulting preform is cured overnight at ambient temperature or with a heat lamp.

The relative amounts of the carbon particles, the silicon carbide fibers, and the polymeric material, if any, may be varied according to the required final structure. By way of providing an illustrative example but not by way of limitation, in a typical case for the slurry process about 50 parts by weight of carbon particles with respect to the epoxy binder solution, about 30–40 volume fraction of silicon carbide fibers, and about 30 parts by weight of binder solution are mixed together and processed as described.

In tape casting, a slurry slip of carbon particles with appropriate binders such as Butvar-76 and solvents such as toluene and MIBK is prepared to a desired casting consistency. The resulting slip material is de-aired. Tape casting is accomplished by pouring the slip onto a sheet and spreading it to uniform thickness (typically 0.010–0.015 inches) with a doctor blade. The silicon carbide fibers or mats may be placed onto the sheet before the slip is cast and secured with tape, or placed onto the slip after it is cast. The resulting tape material is dried for two hours. A preform is prepared by cutting the tapes into appropriately sized pieces and building up the preform by conventional buildup of these pieces. If the silicon carbide fibers or mats were not incorporated into the tapes, the buildup is accomplished by alternating layers of tapes and layers of fibers or mats. The built-up structure is consolidated in a laminating press at 220° F. and 500 pounds per square inch pressure.

Figure 2:
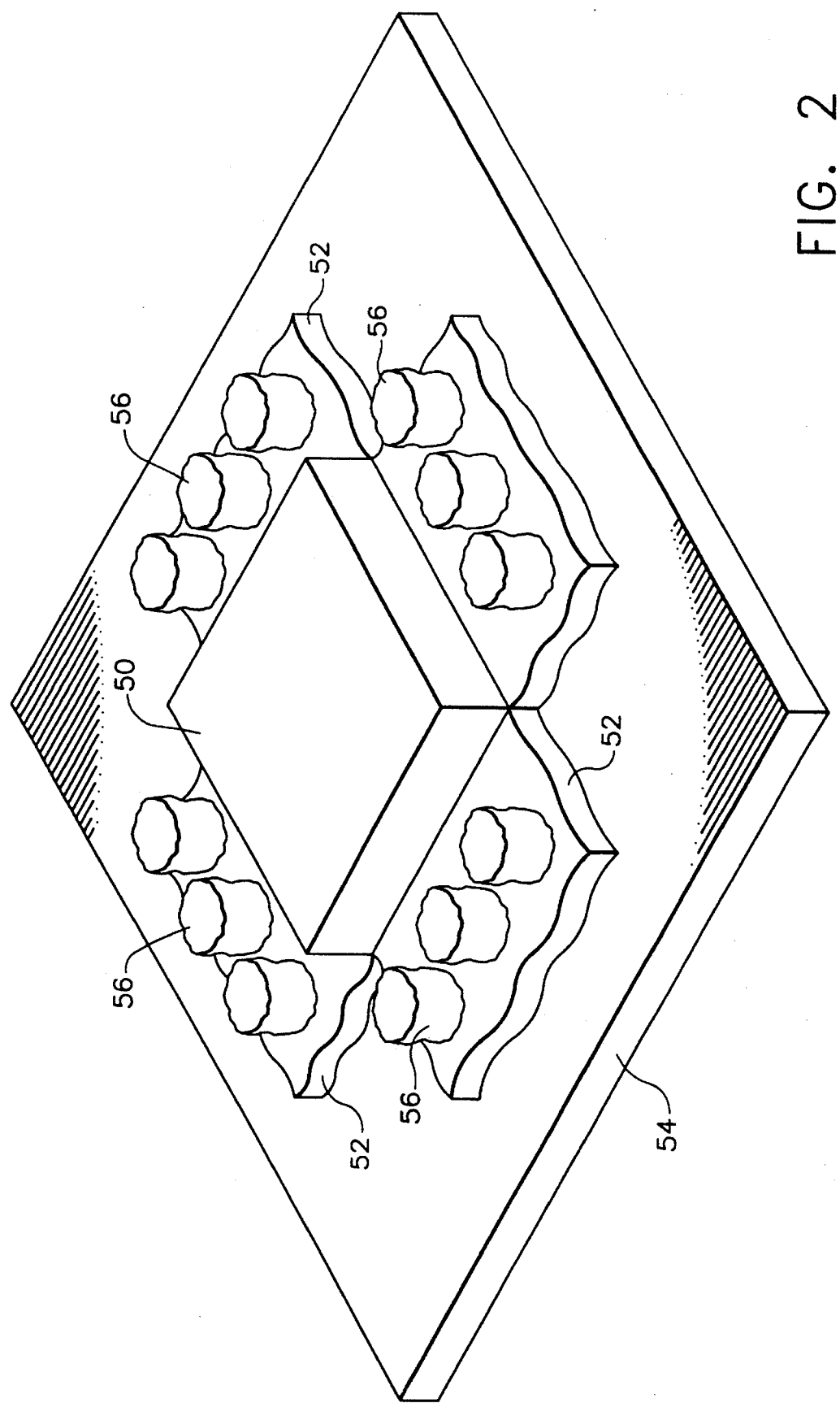
FIG. 2 is a drawing of the microstructure of a silicon carbide-containing material prepared by a conventional approach.

The final preform 50 is illustrated in FIG. 2. In FIG. 2, the preform 5 is depicted for convenience as a rectangular block, but it may be of any required moldable shape.

The preform 50 is supported on a plate 54 made of a material that is not wet by the material to be infiltrated, and does not chemically react with the wick 52 or the preform 50 in any adverse manner during processing. In the preferred embodiment, the plate 54 is graphite coated on its surface contacting the preform 50 with boron nitride, which is not wet by molten silicon.

A wick 52 is provided, numeral 26. The wick 52 is made of a material that is wetted by the silicon carbide to be infiltrated into the preform 50. In the preferred embodiment, wherein silicon is to be infiltrated to form a silicon carbide/silicon carbide composite material, the wick is preferably carbon in the form of carbon fibers. The carbon fibers are available as tows of fine fibers in woven or unwoven form. Several wicks 52 can be used, and FIG. 2 depicts the use of four wicks 52. The wicks 52 rest upon the plate 54, and one end of each wick 52 is contacted to the preform 50.

Pieces 56 of the material to be infiltrated are placed onto the other ends of the wicks 52, numeral 28 of FIG. 1. In the preferred embodiment, the pieces 56 are boron-alloyed silicon. The boron is present to remove surface-adsorbed oxygen atoms from the silicon particulates, combining with the oxygen and the silicon to form a borosilicate glass. By gettering the oxygen, the remaining silicon is available to react to form stoichiometric silicon carbide. (Boron-alloyed silicon and other alloys of silicon are within the scope of the term "silicon" as used herein.) This boron-alloyed silicon is prepared by mixing silicon powders with about 3 percent by weight boron powder, and melting the mixture. After solidification, the mass is broken into small pieces 56. The amount of boron-alloyed silicon is preferably selected so that the silicon reacts completely with the carbon particles in the preform during subsequent processing. That is, the total amount of silicon that reacts with the carbon particles is approximately equimolar with the amount of carbon particles in the preform. However, in practice an excess of boron-alloyed silicon is provided to fill the wicks and provide silicon for silicon nitride formation.

Figure 3:
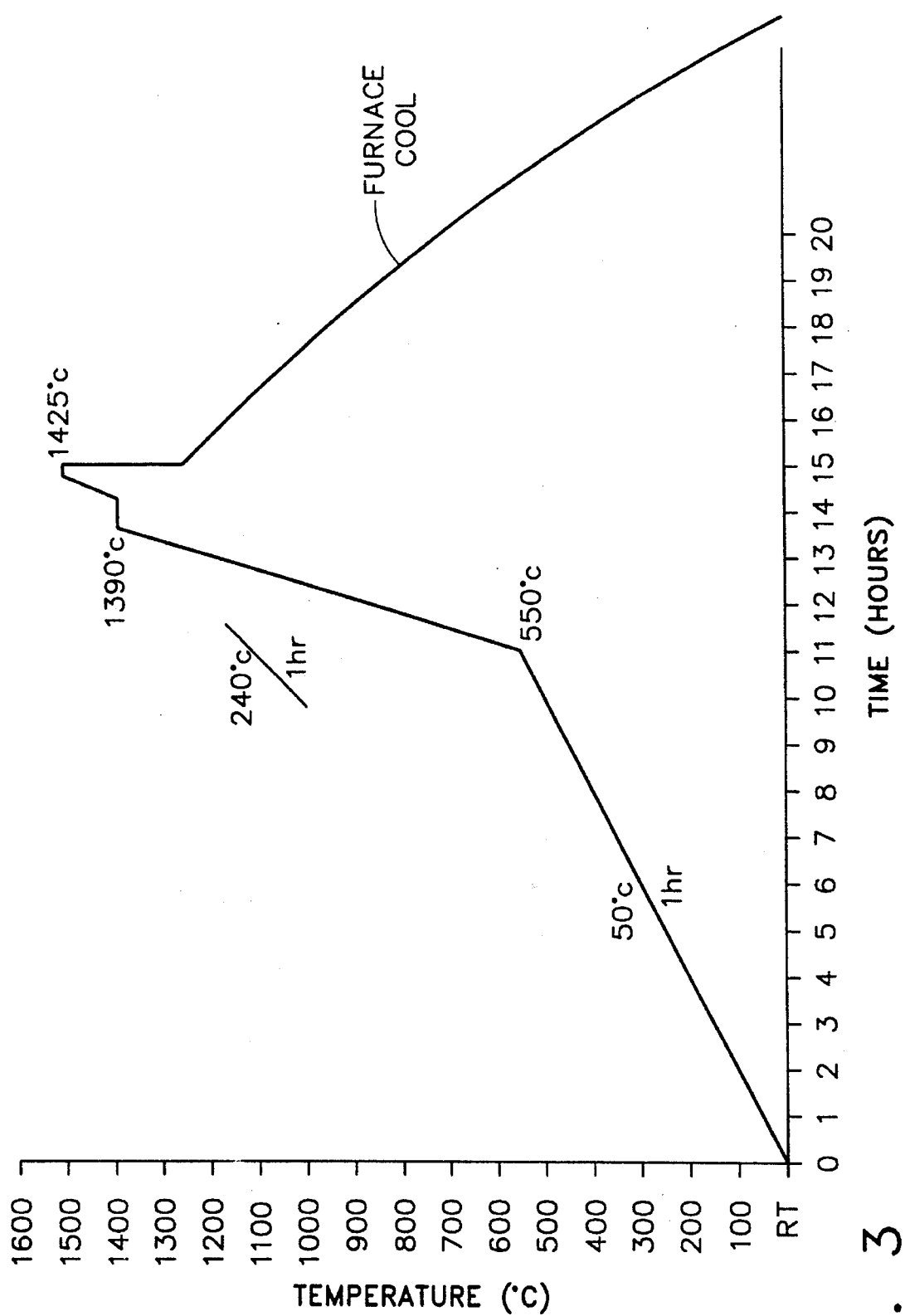
FIG. 3 is a graph of temperature versus time in the thermal processing treatment.

FIG. 2 shows the assembly of preform 50, wicks 52, plate 54, and pieces 56 at this point, prior to subsequent processing. In the next step, the assembly is placed into an enclosure, numeral 30, for a subsequent thermal processing heat treatment. FIG. 3 illustrates the temperature as a function of time for a preferred thermal processing treatment.

Where polymeric material such as epoxy or binder is present in the preform, the binder is removed by heating the preform in vacuum to an intermediate temperature of about 550 C. at a heating rate of 25–50 C. per hour, numeral 30. The slow heating rate permits the polymeric material to gradually vaporize and leave the preform without excessive bubbling that can lead to gas entrapment in the final product.

The interior of the enclosure is thereafter heated to a temperature such that the pieces 56 melt, continuing the heating process of numeral 30. The polymer removal and infiltration steps are preferably conducted in the same furnace with or without intermediate cooling, to avoid handling the preform after polymer removal, as the preform may be fragile at this stage of the processing. In the preferred case, where the pieces 56 are silicon, the assembly is heated at a rate of about 240 C. per hour to a stabilizing temperature, and then heated to a temperature above the melting point of silicon. The preferred maximum temperature is at least about 1425 C. At such temperatures, the boron-alloyed silicon is melted, and the wicking and chemical reaction are typically completed in about 5–15 minutes. The entire thermal processing, including the polymer removal, requires about 15 hours prior to starting cool down to ambient temperature.

A source of nitrogen that is substantially free of oxygen is introduced into the enclosure, numeral 32, during at least a portion of the period at which the preform is heated above the melting point of silicon during the thermal processing. Preferably, the initial portion of the heating is accomplished in a vacuum so that the silicon wicks and flows to the preform. After a period of time, the vacuum is replaced by the oxygen-free atmosphere containing the source of nitrogen, and the heating is completed. In the case described above wherein the total heating period is about 15 hours, the complete cycle from polymer burnout through melt infiltration is accomplished in a vacuum at levels as low as 0.05 torr. The introduction of nitrogen can occur at any point in the process, either intermittently or continuously. The relative amounts of silicon carbide, produced by the reaction between carbon and infiltrated silicon, and silicon nitride, produced by the reaction between the remaining silicon and nitrogen, can be controlled by varying the amount of infiltrated silicon relative to the amount of carbon particles, and the time at which the atmosphere is switched from vacuum to the source of nitrogen.

The source of nitrogen is preferably introduced at a pressure which allows for the thermodynamics to be controlled in the reaction rate regime, typically reduced pressure. The nitrogen is as free of oxygen as commercially practical.

The source of nitrogen can be diatomic nitrogen gas molecules, or it can be molecules of a nitrogen-containing compound that is substantially free of reactive oxygen. A nitrogen-containing compound wherein the nitrogen is more reactive than in nitrogen gas is preferred. A most preferred source of nitrogen is oxygen-free ammonia.

At the temperature above the melting point of the boron-alloyed silicon, the boron-alloyed silicon melts and flows ("wicks") along the wick 52 to the preform 50 by capillary action, numeral 34. When the molten boron-alloyed silicon reaches the preform 50, it chemically reacts with the carbon particles to form silicon carbide with a minor amount of boron present. Excess boron may be available to react to form boron nitride or boron carbide. The silicon carbide fibers already present in the preform remain and do not react with the infiltrated boron-alloyed silicon. The result is a composite material of silicon carbide fibers embedded in a silicon carbide (with some boron) matrix.

The silicon carbide matrix of the composite material is formed by the reaction between the infiltrated silicon and the carbon particles in the preform. If this reaction were carried to completion in all cases, the present invention would not be required. Unfortunately, because of various reasons the infiltrated silicon often does not react fully with the carbon, leaving small carbon particles and islands of unreacted silicon in the microstructure.

Figure 4:
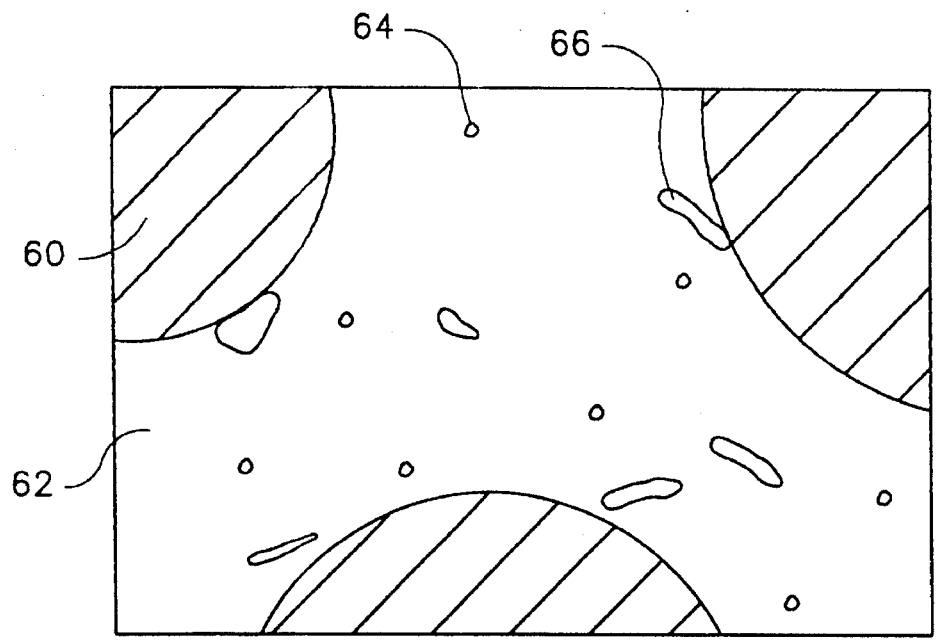
FIG. 4 is a drawing of the microstructure of a silicon carbide/silicon carbide composite material prepared by a prior approach.

FIG. 4 shows the type of microstructure that can result from the conventional processing, wherein the atmosphere during the heating and wicking steps is a vacuum or air. Silicon carbide fibers 60 are embedded in a matrix that is primarily silicon carbide 62. Within the matrix, however, are unreacted particles of carbon 64 and small islands of unreacted silicon 66. The unreacted carbon particles are not particularly troublesome. However, the islands of unreacted silicon 66 remelt upon heating during service of the composite material to a service temperature above the melting point of silicon, which frequently occurs in many applications. At such service temperatures, the composite material contains small liquid islands of silicon within the microstructure, which directly weakens the material significantly. Moreover, the molten silicon can attack and degrade the silicon carbide fibers 60 as well.

Figure 5:
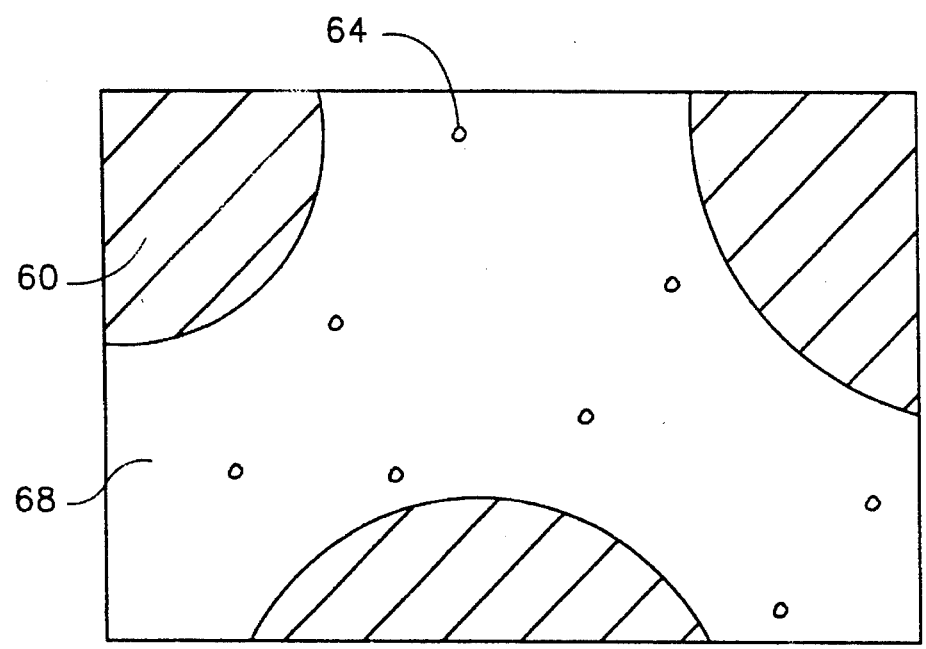
FIG. 5 is a drawing of the microstructure of a silicon carbide/silicon carbide composite material prepared by the present approach.

FIG. 5 shows the microstructure that results from the present approach. The silicon carbide fibers 60 reside in a matrix 68 that is a solid solution of silicon carbide and silicon nitride, with a few carbon particles 64. The structure of the matrix is produced as a result of the reaction of the free infiltrated silicon with nitrogen to produce silicon nitride. The silicon nitride dissolves in the silicon carbide produced by the reaction between the carbon and the infiltrated silicon, producing a solid solution matrix with the unreacted carbon particles embedded therein.

The reaction of silicon with nitrogen to produce silicon nitride yields a further benefit of improving the oxidation resistance of the finished silicon carbide/silicon carbide composite material. Such materials are normally sensitive to oxidation during elevated temperature service. The presence of the silicon nitride in the silicon carbide matrix reduces the diffusion rate of oxygen in the matrix, improving the oxidation resistance. The silicon nitride develops preferentially near the surface of the composite material, acting as an internal oxidation-resistant rim within the material. The use of separately applied oxidation-resistant coatings can therefore be minimized or avoided. The internal silicon nitride component is preferable to an externally applied oxidation-resistant coating, because it forms uniformly around the periphery of the composite material regardless of its shape, and because it is not worn away during service.

The present invention therefore provides a modified silicon carbide/silicon carbide composite material that is resistant to elevated temperature strength reduction due to internal silicon melting, and is also resistant to oxidation damage. This invention has been described in connection with specific embodiments and examples. However, it will be readily recognized by those skilled in the art the various modifications and variations of which the present invention is capable without departing from its scope as represented by the appended claims.

What is claimed is:

1. A process for preparing a material, comprising the steps of:

preparing a preform comprising
      carbon particles, and
      silicon carbide fibers;

contacting a first end of a wick to the preform, the wick being made of a material that is wet by molten silicon;

heating the wick and the preform to a temperature greater than the melting point of silicon, at least a portion of the step of heating being performed in an atmosphere containing a source of nitrogen and substantially free of oxygen; and flowing silicon along the wick to the preform such that the amount of silicon reaching the preform is in about equimolar proportion to the carbon particles, wherein the silicon reacts with the carbon particles to form silicon carbide and the nitrogen reacts with any remaining free, unreacted silicon within the preform to form silicon nitride whereby free silicon is eliminated from the resulting material.

2. The process of claim 1, wherein the silicon carbide fibers are in the form of monofilament fibers.

3. The process of claim 1, wherein the silicon carbide fibers are in the form of multifilament fibers.

4. The process of claim 1, wherein the silicon carbide fibers are in the form of a woven fabric.

5. The process of claim 1, wherein the wick is made of carbon.

6. The process of claim 1, wherein the preform further includes
a polymeric binder.

7. The process of claim 1, wherein the source of nitrogen is ammonia gas.

8. The process of claim 1, wherein the source of nitrogen is nitrogen gas.

9. The process of claim 1, wherein the step of heating includes the steps of:

first supplying a vacuum in the region of the preform, and thereafter supplying the source of nitrogen in the region of the preform.

10. The process of claim 1, wherein the step of flowing silicon includes the step of providing boron-alloyed silicon to flow along the wick.

11. A material prepared by the process of claim 1 wherein the silicon nitride formed is an in-situ solid solution throughout the silicon carbide formed in the step of flowing.

12. A process for preparing a material, comprising the steps of:

preparing a preform comprising
carbon particles, and
silicon carbide fibers;

contacting a first end of a wick to the preform, the wick being made of a material that is wet by molten silicon;

contacting silicon to the wick at a location remote from the first end of the wick;

heating the wick and the preform to a temperature greater than the melting point of silicon; and maintaining the wick and the preform at a temperature greater than the melting point of the silicon to permit the silicon to flow along the wick to the preform such that the amount of silicon reaching the preform is in about equimolar proportion to the carbon particles, wherein the silicon reacts with the carbon particles to form silicon carbide, the step of maintaining being performed initially in a vacuum and thereafter with a gaseous source of nitrogen contacting the preform, the source of nitrogen being substantially free of oxygen, wherein the nitrogen reacts with any free, unreacted silicon within the preform to form silicon nitride whereby there is an elimination of free silicon in a final material resulting from the step of maintaining.

13. The process of claim 12, wherein the silicon carbide fibers are in the form of monofilament fibers.

14. The process of claim 12, wherein the silicon carbide fibers are in the form of a woven fabric.

15. The process of claim 12, wherein the wick is made of carbon.

16. The process of claim 12, wherein the preform further includes
a polymeric binder.

17. The process of claim 12, wherein the source of nitrogen is ammonia gas.

18. The process of claim 12, wherein the source of nitrogen is nitrogen gas.

19. The process of claim 12, wherein the step of flowing silicon includes the step of providing boron-alloyed silicon to flow along the wick.

20. A material prepared by the process of claim 12, wherein the silicon nitride formed is an in-situ solid solution throughout the silicon carbide formed in the step of maintaining.

* * * * *